US012217610B2

(12) United States Patent
Veerayya

(10) Patent No.: US 12,217,610 B2
(45) Date of Patent: Feb. 4, 2025

(54) UAM CORRIDOR VISUAL INDICATION

(71) Applicant: Rockwell Collins, Inc., Cedar Rapids, IA (US)

(72) Inventor: Shivashankar Maddanimath Veerayya, Bangalore (IN)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 18/213,057

(22) Filed: Jun. 22, 2023

(65) Prior Publication Data

US 2024/0282199 A1 Aug. 22, 2024

(30) Foreign Application Priority Data

Feb. 16, 2023 (IN) ............................. 202311010416

(51) Int. Cl.
*G08G 5/00* (2006.01)
*G08G 5/02* (2006.01)

(52) U.S. Cl.
CPC ........... *G08G 5/0013* (2013.01); *G08G 5/025* (2013.01)

(58) Field of Classification Search
CPC ............................. G08G 5/0013; G08G 5/025
See application file for complete search history.

(56) References Cited

U.S. PATENT DOCUMENTS 11,538,203 B2 12/2022 Holder et al.
2008/0309518 A1* 12/2008 Aung ..................... G08G 5/025 340/979
2010/0052949 A1* 3/2010 Suddreth ................ G01C 23/00 340/995.19
2010/0161158 A1* 6/2010 Gannon ................. G01C 23/00 701/4
2011/0169665 A1* 7/2011 Palanisamy .......... G08G 5/0021 340/961
2012/0310524 A1* 12/2012 Pepitone ................ G08G 5/025 701/411
2014/0074324 A1* 3/2014 Burgin ................. G08G 5/0021 701/9
2014/0267422 A1* 9/2014 Feyereisen ........... G01C 23/005 345/634
2017/0349295 A1 12/2017 Pepitone et al.
2018/0327110 A1 11/2018 Shanbhag et al.
(Continued)

FOREIGN PATENT DOCUMENTS

EP 1369665 A2 12/2003

OTHER PUBLICATIONS

Version 1.0 Urban Air Mobility (UAM) Concept of Operations (ConOps), Federal Aviation Administration, Nextgen; Feb. 2020.

*Primary Examiner* — Phutthiwat Wongwian
*Assistant Examiner* — Susan E Scharpf
(74) *Attorney, Agent, or Firm* — Suiter Swantz IP

(57) ABSTRACT

A system for graphical indication of a corridor is disclosed. The system may include a display and a processor. The processor may be configured to receive corridor position data of a corridor and aircraft position data indicative of a position of an aircraft. The processor may also be configured to determine a relative distance of the aircraft in relation to the corridor based on the corridor position data and the aircraft position data. The processor may further be configured to display a corridor graphic associated with the corridor based on the relative distance.

16 Claims, 5 Drawing Sheets

(56) References Cited

U.S. PATENT DOCUMENTS

| | | | | |
|---|---|---|---|---|
| 2021/0132611 | A1* | 5/2021 | Dolgov | G08G 7/00 |
| 2022/0084416 | A1* | 3/2022 | Maddanimath | G08G 5/0039 |
| 2022/0327937 | A1* | 10/2022 | Ayhan | G08G 5/0021 |
| 2022/0327939 | A1* | 10/2022 | Gurusamy | G08G 5/025 |
| 2022/0335842 | A1* | 10/2022 | Thiyagarajan | G08G 5/0026 |
| 2022/0388674 | A1 | 12/2022 | Kanagarajan et al. | |
| 2022/0406199 | A1 | 12/2022 | Labreuche et al. | |
| 2022/0406201 | A1 | 12/2022 | Johnson et al. | |

* cited by examiner

300

310

UAM CORRIDOR VISUAL INDICATION

CROSS-REFERENCE TO RELATED APPLICATIONS

The present application claims the benefit of India Provisional Patent Application No. 20/231,1010416, filed Feb. 16, 2023, titled UAM CORRIDOR VISUAL INDICATION, naming Shivashankar Maddanimath Veerayya as inventor, which is incorporated herein by reference in the entirety.

TECHNICAL FIELD

The present disclosure relates generally to displaying corridors on flight displays, and, more particularly, to displaying a graphic related to Urban Air Mobility (UAM) corridors based on a relative distance to the UAM corridors.

BACKGROUND

According to UAM ConOPS V1.0 titled "Concept of Operations" created by the FAA, aircraft must operate under UAM specific rules, procedures, and Community based Rules (CBRS) when operating in UAM Corridors (e.g., static as well as Dynamic Delegated Corridors). Fixed wing and Unmanned Traffic Management (UTM) aircraft operate across corridors. Helicopters and UAM aircraft operate within and across corridors. When these aircrafts are outside corridors relevant ATM rules are applicable. A visual indication to remind/inform the users near corridors of relevant corridor rules or ATM/UTM rules may be desired.

SUMMARY

A system for graphical indication of a corridor is disclosed in accordance with one or more illustrative embodiments of the present disclosure. In one illustrative embodiment, the system may include a display and a processor. In another illustrative embodiment, the processor may be configured to receive corridor position data of a corridor and aircraft position data indicative of a position of an aircraft. In another illustrative embodiment, the processor may be configured to determine a relative distance of the aircraft in relation to the corridor based on the corridor position data and the aircraft position data. In another illustrative embodiment, the processor may be configured to display a corridor graphic associated with the corridor based on the relative distance.

A method is disclosed in accordance with one or more illustrative embodiments of the present disclosure. In one illustrative embodiment, the method may include receiving corridor position data of a corridor and aircraft position data indicative of a position of an aircraft. In another illustrative embodiment, the method may include determining a relative distance of the aircraft in relation to the corridor based on the corridor position data and the aircraft position data. In another illustrative embodiment, the method may include displaying a corridor graphic associated with the corridor based on the relative distance.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

DETAILED DESCRIPTION

Figure 1:
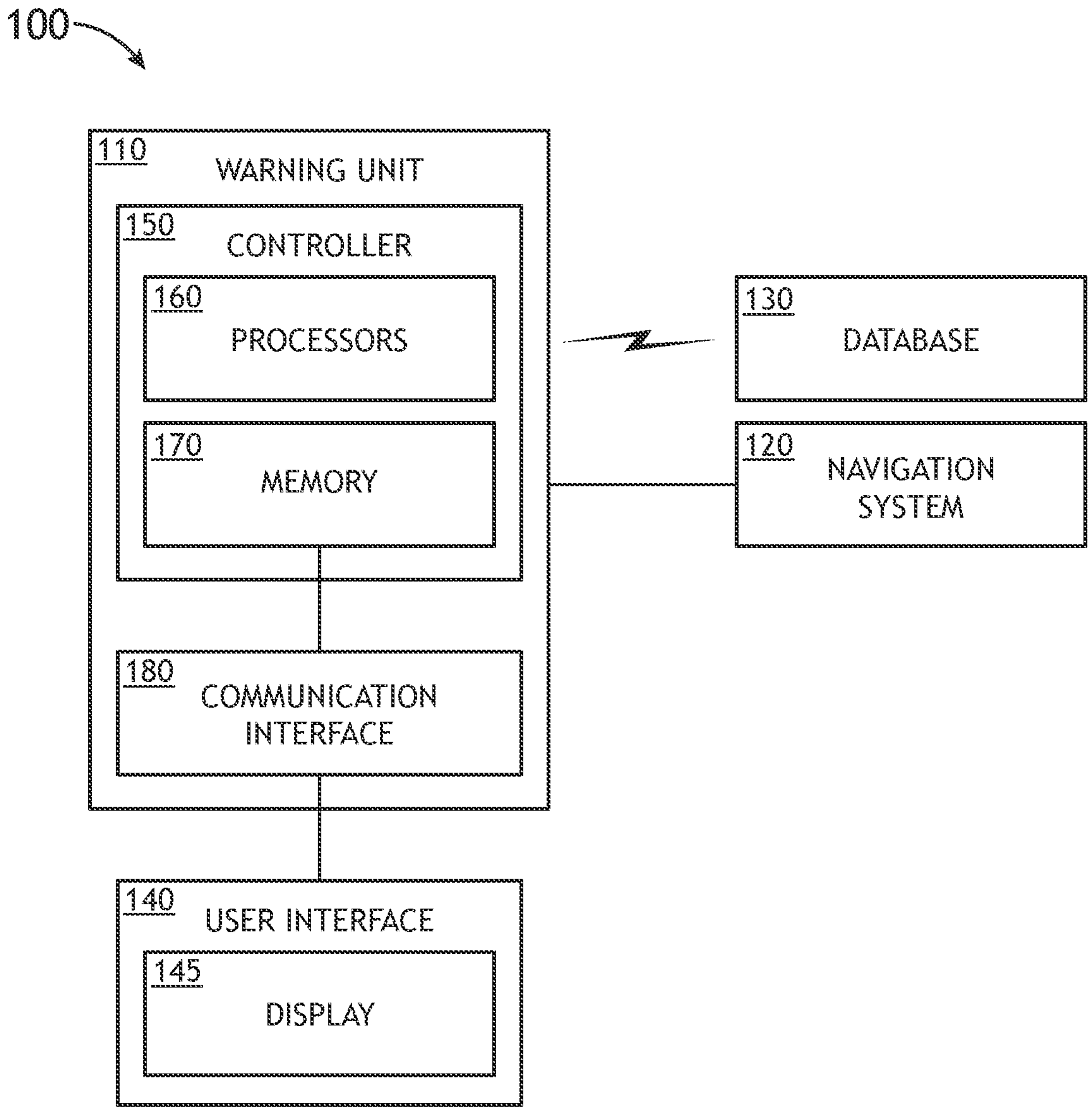
FIG. 1 is a simplified block diagram of an aircraft including a system for graphical indication of a corridor, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

Systems in the art are known for warning about operational areas. For example, a system for indicating an unmanned aerial vehicle (UAV) operational area is disclosed in U.S. patent application Ser. No. 17/101,207, filed Nov. 23, 2020, which is hereby incorporated by reference in its entirety.

Referring now to the present disclosure, a system, method, and device configured to warn pilots of Urban Air Mobility (UAM) corridors are disclosed. The system includes a warning unit on-board an aircraft that receives UAM corridor data from a database, and correlates the data with aircraft position data and/or flight plan data derived from a navigation system to determine if the aircraft is approaching a known UAM corridor that may require following relevant UAM corridor rules. If a UAM corridor is identified, a graphic may be displayed to the user to increase situational awareness, such as allowing a pilot to prepare to follow relevant UAM rules. In the industry of UAM, some believe the term Advanced Air Mobility (AAM) may be a better phrase to use, due to the expansion of UAM standards, rules, and operations into non-urban settings. For example, use cases that are not necessarily urban in nature include, but are not necessarily limited to, Commercial Inter-city (Longer Range/Thin Haul), Cargo Delivery, Public Services, Private/Recreational Vehicles, and/or the like. For purposes of the present disclosure, the terms UAM and AAM may be used interchangeably.

Broadly speaking, embodiments of the inventive concepts disclosed herein are directed to a system and method for graphical indication of a corridor relative to an aircraft. In some embodiments, two display modes may be used, one for showing a relative distance when approaching a corridor, and one for showing, generally, that the aircraft is already located in the corridor. These modes may generally improve a user's (e.g., pilot's) situational awareness by prominently being displayed in relevant areas of a display.

FIG. 1 is a system 100 for a graphical indication of a corridor, in accordance with one or more embodiments of this disclosure. The system 100 includes a warning unit 110, in communication with a navigation system 120, a database 130 and a user interface 140. The navigation system 120 is disposed within the aircraft. The warning unit 110 may additionally include, but is not limited to, a controller 150. In embodiments, the system 100 is configured for an aircraft. The system 100 may be configured for any aircraft known, including but not limited to, fixed-wing aircraft or rotorcraft.

In embodiments, the warning unit 110 includes hardware, software, and/or firmware configured to execute the various functions or steps described herein. The controller 150 is configured to receive, process, and transmit data within the system 100. The controller 150 includes one or more processors 160 configured to perform functions or steps according to program instructions stored in a memory 170. The controller may also send and receive data and signals via a communication interface 180 to other components of the warning unit 110 and/or the system 100. For example, the controller 150 may be configured to receive corridor position data from the database 130 and aircraft position data from the navigation system 120, process the data (e.g., determine a relative distance between the corridor position data to the aircraft position data), and display graphics (e.g., a corridor graphic associated with the corridor) to the user interface 140.

For purposes of the present disclosure, "operable to", "configured to be operable to", and the like may mean being configured to execute software such as program instructions stored on the memory 170, and/or the like.

The user interface 140 may include any device capable of displaying data to a user and/or receiving data input from a user including but not limited to a display 145, a keyboard, a joystick, a mouse, an audio device, or a haptic device. For example, the user interface may include a display 145 in combination with a keyboard. In another example, the user interface may include a display 145 with a touchscreen. The user interface 140 may be physical linked with the warning unit 110. For example, the warning unit 110 and the user interface 140 may be configured as single modular unit. Alternatively, the user interface 140 may be physically detached from the warning unit 110. For example, the user interface 140 and the warning unit 110 may both be on-board an aircraft, but linked only communicatively via a wireline or wireless connection.

In the case of a touchscreen display, those skilled in the art should recognize that a large number of touchscreen displays may be suitable for implementation in the present invention. For instance, the display 145 may be integrated with a touchscreen interface, such as, but not limited to, a capacitive touchscreen, a resistive touchscreen, a surface acoustic based touchscreen, an infrared based touchscreen, or the like. In a general sense, any touchscreen display capable of integration with the system 100 is suitable for implementation in the present invention.

The display 145 may include any type of display device known in the art. For example, the display may include, but are not limited to, a liquid crystal display (LCD), a light-emitting diode (LED) based display, an organic light-emitting diode (OLED) based display, an electroluminescent display (ELD), an electronic paper (E-ink) display, a plasma display panel (PDP), a display light processing (DLP) display, a cathode-ray tube (CRT), or the like. Those skilled in the art should recognize that a variety of display devices may be suitable for implementation in the present invention and the particular choice of display device may depend on a variety of factors, including, but not limited to, form factor, cost, and the like.

In some embodiments, the user interface 140 may include a display 145 that is part of, or incorporated into, a primary flight display (PFD), an aircraft instrument dedicated to flight information. For example, the display 145 may be configured as a picture-in-picture (PIP) display within a PFD, wherein data from the system 100 is displayed as the first image along with other data from different aircraft systems displayed as a second image. In another example, data from the system 100 is overlaid on a PFD that has incorporates data from other systems. For instance, data from the system 100 may appear as icons/symbols/graphics on an aircraft display that are overlaid upon, or incorporated into a virtual landscape on the PFD that corresponds to the position of the aircraft. Any configuration of PIP display or overlaid display is possible. For example, the data from the system 100 may be maximized to cover an entire quadrant of the PFD. In another example, the display 145 may be minimized on the PFD. For the purposes of this disclosure, the PFD, and/or a portion of the PFD may be configured as a display 145 for the system 100.

In some embodiments, the user interface 140 may include a display that is part of, or incorporated into, a map display and/or a navigation display. For example, the display may be similarly configured for use with the map display and/or navigation display as described for the PFD described herein.

In some embodiments, the user interface 140 may include any display or type of display used onboard an aircraft. For example, the display may include a primary flight display (PFD). The display may also include any type of virtualized or augmented vision system including but not limited to a synthetic vision system (SVS), a heads-up display (HUD) a head-mounted display (HMD), a virtual reality (VR) system, a mixed reality (MR) system, an augmented reality (AR) system and an extended reality (XR) system. For example, the user interface may be an SVS display, wherein data from the system 100 is incorporated into the SVS display.

In embodiments, the database 130 stores the location of a plurality of UAM corridors for vehicles operating under UAM rules. For example, the United States Federal Aviation Administration (FAA) and the United States National Aeronautics and Space Administration (NASA), as well as other industry and national and international administration agencies, are developing a safe and efficient aviation transportation system (e.g., referred to as UAM and/or AAM) that will, generally, use highly automated aircraft (e.g., automated vertical takeoff taxis, etc.) that will operate and transport passengers and/or cargo at lower altitudes (e.g., between 400 to 1500 feet, between 400 to 3,000 feet, 990 feet and below, and/or the like as decided by UAM authorities) where air traffic services are typically not provided. Low-flying drones are a growing hazard for aircraft, as their use are becoming more common in areas around airports, increasing the chance that an aircraft may collide with a drone upon takeoff or landing. One possible result of a UAM ecosystem is the creation of a database 130 that stores the location of corridors (e.g., areas that are likely to have UAM vehicles in the air)). Data from this database 130 may be then be shared within components of the system 100 allowing the system 100 to warn a pilot that an aircraft may be flying in or near a UAM corridor.

It is noted herein that the one or more components of the system 100 may be communicatively coupled to the various other components of the system 100 in any manner known in the art. For example, the one or more processors 160 may be communicatively coupled to each other and other components of the system 100 via a wireline (e.g., copper wire, fiber optic cable, and the like) or wireless connection (e.g., RF coupling, IR coupling, Wi-Fi signals, 5G signals, LoRa, Bluetooth, BLE, Zigbee, Z-wave, 6LoWPAN, NFC, WIFI Direct, GSM, LTE. NB-IOT, LTE-M, and the like). For example, the database 130 may communicate with the warning unit 110 via an RF signal. For instance, the database 130 may be configured as a remote server (e.g., ground-based server) that communicates wirelessly with the warning unit 110 via an RF signal. In another example, the database 130 may be configured as an on-board server (e.g., aircraft-based server) that communicates wirelessly with the warning unit 110 via a Bluetooth signal. In another example, database 130 may be configured as an on-board server that communicated with the warning unit 110 via a copper wire connection.

The one or more processors 160 may include any type of processing elements, including but not limited to integrated circuits (e.g., application specific integrated circuits (ASIC) and field programmable gate arrays (FPGA). The controller 150 is not limited by the materials from which it is formed or the processing mechanisms employed therein and, as such, can be implemented via semiconductor(s) and/or transistors (e.g., using electronic integrated circuit (IC) components), and so forth.

The communication interface 180 may be operatively configured to communicate with components of the system 100. For example, the communication interface 180 can be configured to retrieve data from the controller 150 or other devices (e.g., the database 130, the navigation system 120, the user interface 140 and/or components of the warning unit 110), transmit data for storage in the memory 170, retrieve data from storage in the memory 170, and so forth. The communication interface 180 may also be communicatively coupled with the controller 150 to facilitate data transfer between components of the system 100 and the controller 150. It should be noted that while the communication interface 180 is described as a component of the warning unit 110, one or more components of the communication interface 180 may be implemented as external components communicatively coupled to the warning unit 110 via a wireline and/or wireless connection.

The memory 170 can be an example of tangible, computer-readable storage medium that provides storage functionality to store various data and/or program code associated with operation of system 100 and/or controller 150, such as software programs and/or code segments, or other data to instruct the controller 150, and possibly other components of the system 100, to perform the functionality described herein. Thus, the memory 170 can store data, such as a program of instructions for operating the controller, a base node and its components. It should be noted that while a single memory is described, a wide variety of types of combinations of memory (e.g., tangible, non-transitory memory) may be employed. The memory can be integral with the controller 150, can comprise stand-alone memory, or can be a combination of both. Some examples of the memory can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The navigation system 120 may include any componentry used for aircraft navigation. For example, the navigation system 120 may include a flight management system (FMS). In another example, the navigation system 120 may include a geolocation system (e.g., a global navigational satellite system (GNSS)). For instance, the navigation system 120 may be a geolocation system configured to output an image of a map (e.g., the second image) onto a display (e.g., 2D or 3D map), the map correlating to the current position of the aircraft (e.g., aircraft position data). The navigation system 120 may also include one or more navigation databases. For example, the navigation system may include a navigation database (e.g., NAV DB) that stores navigational and/or geographical data. In another example, the navigation system may include an aircraft warning database (e.g., an enhanced ground proximity warning system (EGPWS) database) that provides relevant terrain and obstacle data.

In embodiments, the warning unit 110 incorporates, or may be incorporated into, the database and/or the navigation system. For example, the warning unit 110 may be an add-on module to a navigation system 120 giving the navigation system increased functionality (e.g., to warn of UAM corridor). In another example, the database 130 may be incorporated into the warning unit 110 (e.g., the warning unit 110 is preloaded with all corridor position data needed for the flight). In another example, database 130 and the warning unit 110 may be incorporated into the navigational system 120. For instance, the navigation system 120 may include componentry and/or software that comprises the warning unit 110 (e.g., a software upgrade to the navigation system 120 may give the navigation system 120 the functionality of the warning unit 110) and be configured to store and utilize corridor position data. Many combinations of warning unit 110, navigation system 120 and database 130 are possible within the system 100. Therefore, the above description should not be interpreted as a limitation of the present disclosure, but merely an illustration.

Figure 2:
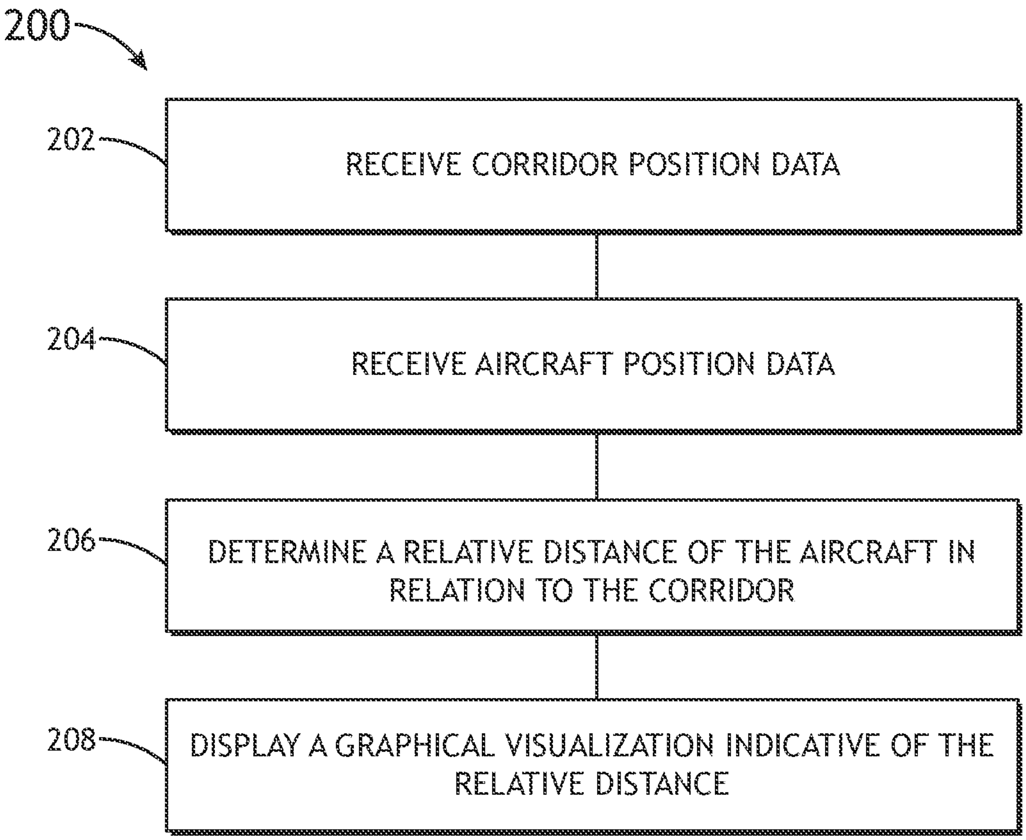
FIG. 2 is a flow diagram illustrating steps performed in a method for a graphical indication of a corridor, in accordance with one or more embodiments of the present disclosure.

FIG. 2 is a flow diagram illustrating steps performed in a method 200 for a graphical indication of a corridor, in accordance with one or more embodiments of the present disclosure. The method 200 may be performed by a system 100, such as the system 100 illustrated in FIG. 1.

At step 202, the corridor position data of a corridor is received. The corridor position data may include, but is not limited to, a location (e.g., latitude/longitude coordinates defining a boundary or center of the corridor, and/or the like) of the corridor, dimensions (e.g., 3D dimensions such as width, height, and/or length, boundary points of the corridor, and/or the like) of the corridor, and any other data associated with the corridor. An example of a corridor is shown by corridor graphic 302 in FIG. 3C. In some examples, a corridor is akin to a 3-dimensional tunnel in airspace.

At step 204, the aircraft position data indicative of a position of an aircraft is received. The aircraft position data may include, but is not limited to, a location of the aircraft, a speed of the aircraft, a flight plan of the aircraft, and the like.

At step 206, a relative distance of the aircraft in relation to the corridor is determined based on the corridor position data and the aircraft position data. The relative distance may be a distance between the aircraft and the corridor. For example, a program configured to calculate a 2-dimensional and/or 3-dimensional distance between the aircraft and a boundary of the corridor may be used, as are known in the art. For example, a difference between the X, Y, and Z coordinates in the units used by such a program may be calculated to generate the relative distance. For an example of a relative distance, see numerical text 308 (e.g., 3 nm) in FIG. 3A.

At step 208, a corridor graphic 302 associated with the corridor based on the relative distance is displayed. See FIG. 3A for an example of a corridor graphic 302. The corridor graphic 302 may be displayed on the display 145 of the system 100.

Note that step 208 may include one or more sub-steps. For example, the system 100 may be configured to display a graphic 302 showing a state of being in a corridor when that state is reached (see FIG. 3B) and to show a relative location of the corridor on the display when approaching a corridor (see FIG. 3A). In this regard, two display modes may be used, one for showing distance when approaching a corridor, and one for showing, generally, that the aircraft is already located in a corridor. These modes may generally improve a user's (e.g., pilot's) situational awareness.

Figure 3A:
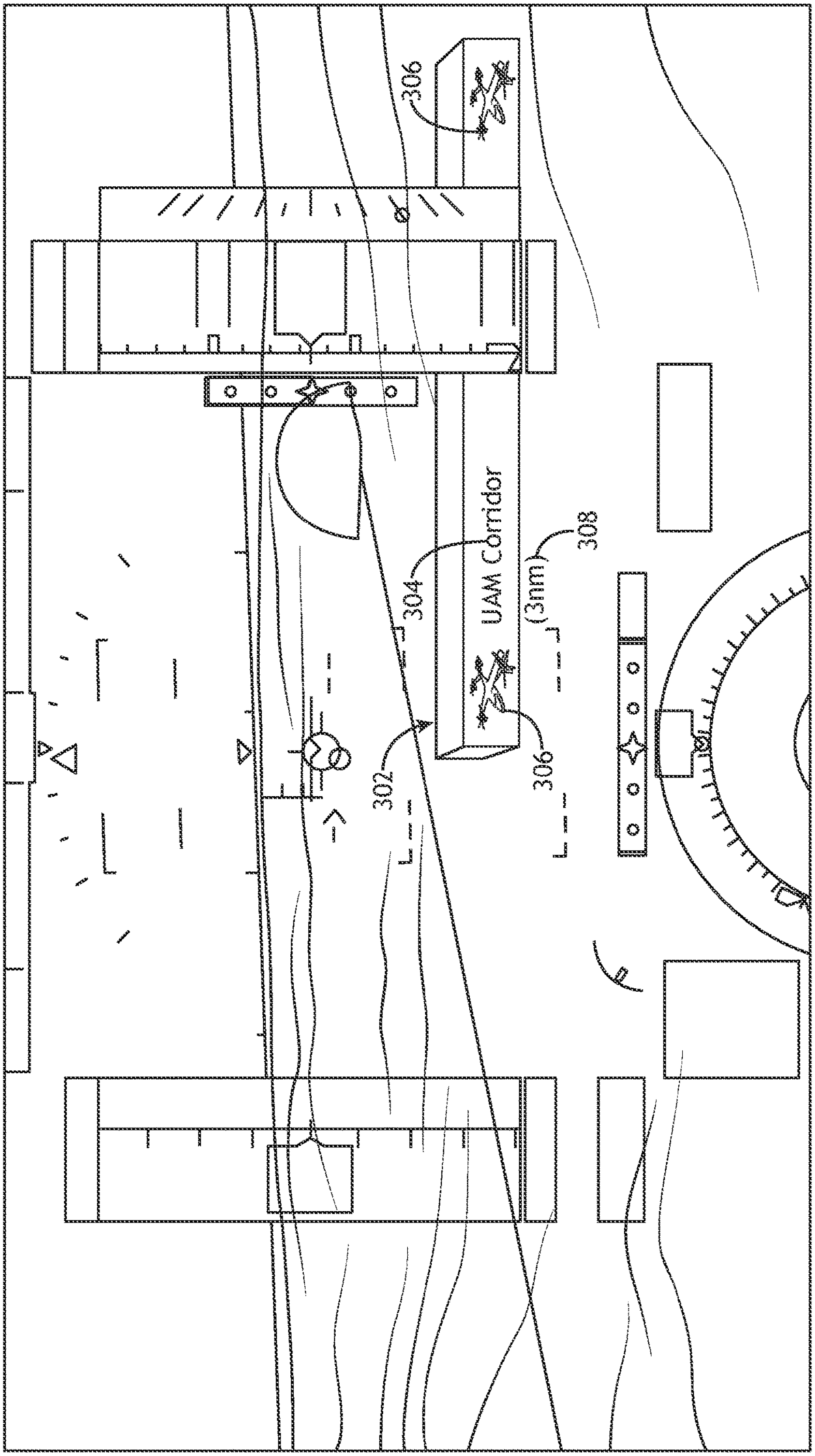
FIG. 3A is a diagram of a display for the system during an imminent occupation state, in accordance with one or more embodiments of this disclosure.
Figure 3B:
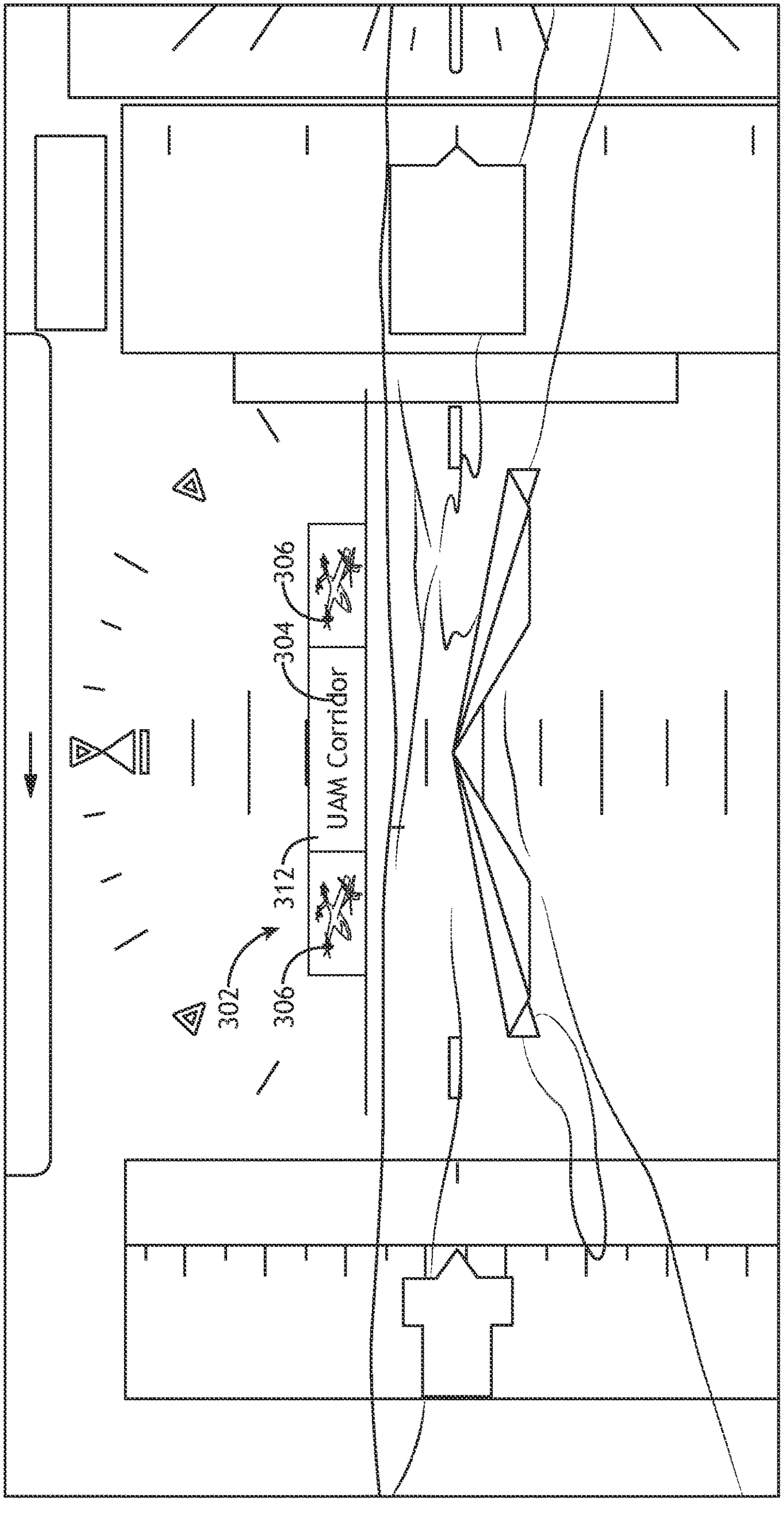
FIG. 3B is a diagram of a display for the system during a current occupation state, in accordance with one or more embodiments of this disclosure.

FIG. 3A and FIG. 3B show examples of corridor graphics 302. In FIG. 3A, the corridor graphic 302 is a dynamic inserted graphic (e.g., a 2D and/or 3D graphic (e.g., rectangular tunnel volume) inserted into a map (e.g., 3-dimensional terrain) representing the environment surrounding an aircraft). In FIG. 3B, the corridor graphic 302 is more akin to an alert such as a pop-up window, that may be fixed in place on a screen and appear when appropriate to indicate that the aircraft is currently occupying a corridor. In some embodiments, the system 100 is configured to transition from a corridor graphic 302 that is dynamically mapped to a map when approaching a corridor (e.g., imminent occupation state) and an alert when occupying a corridor (e.g., current occupation state).

Figure 3C:
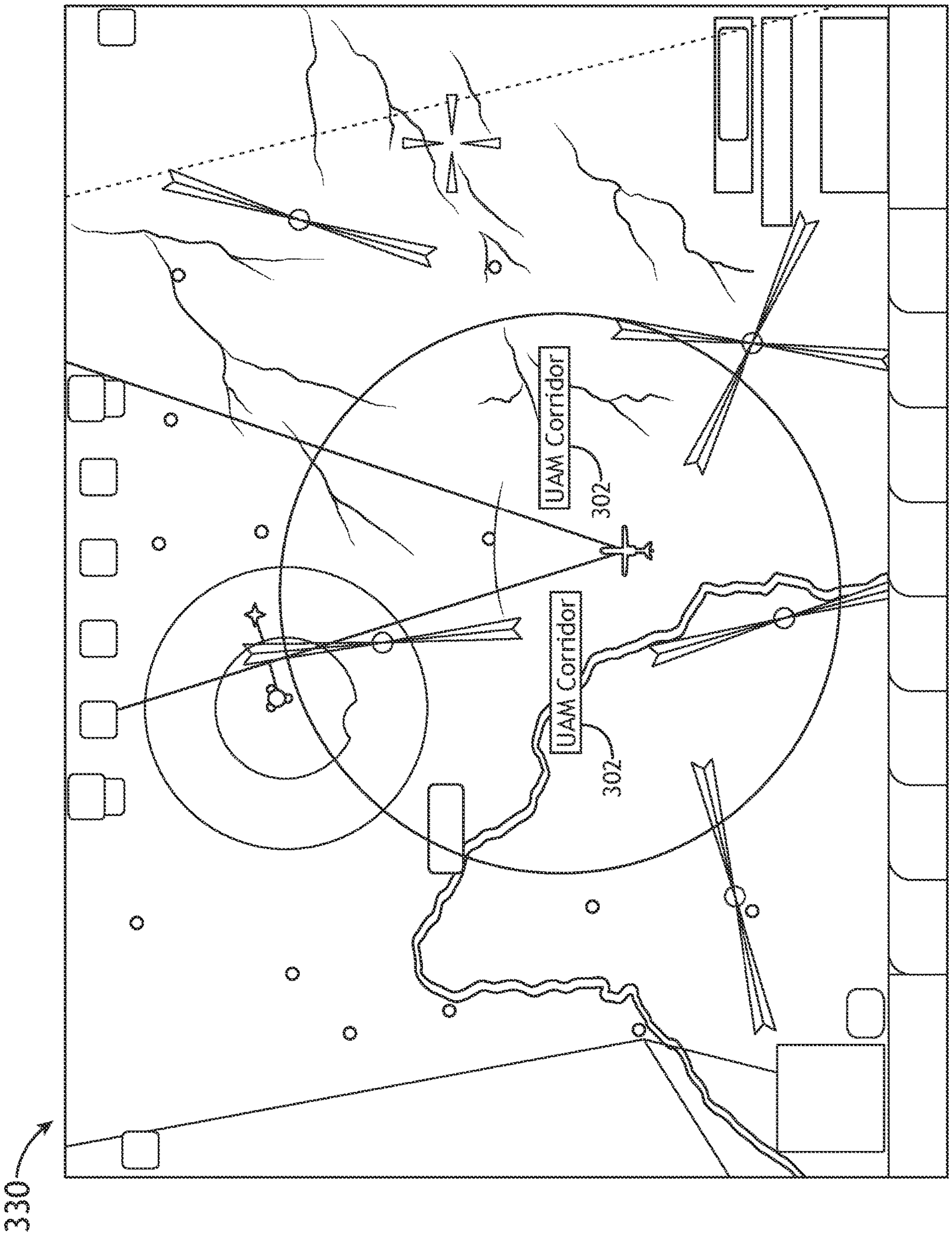
FIG. 3C is a top-down diagram of a display for the system, in accordance with one or more embodiments of this disclosure.

In some embodiments, the corridor graphic 302 may include a visual symbol 306 of an aircraft on each side of a corridor label text 304. For example, the corridor graphic 302 may include a horizontal alignment of the visual symbols 306 of the aircraft, and the corridor label text 304. The placement and/or color of the corridor graphic 302 relative to other symbols may be configured to provide a visual indication of the relative distance of the aircraft to the corridor. For example, the corridor graphic 302 may be mapped to 3-dimensional space as shown in FIG. 3A and/or 2-dimensional space as shown in FIG. 3C.

FIG. 3A is a diagram of a display 300 for the system 100 during an imminent occupation state (e.g., when the aircraft is approaching and/or near the corridor), in accordance with one or more embodiments of the present disclosure. As shown, the display 145 includes a corridor graphic 302 dynamically mapped to the 3-dimensional environment and associated with the corridor. The corridor graphic 302 includes a corridor label text 304, such as "UAM Corridor", and one or more visual symbols 306 of an aircraft. The corridor graphic 302 also includes numerical text 308 indicative of the relative distance of the aircraft to the corridor.

In some embodiments, the processor 160 of the system 100 may be further configured to be operable to calculate the aircraft is in an imminent occupation state based on the relative distance. For example, the imminent occupation state may be indicative that the aircraft is on a trajectory predicted to cause an occupation (i.e., breach) of the aircraft with the corridor. When the aircraft is calculated to be in the imminent occupation state, the processor 160 may be further operable to display numerical text 308 (e.g., 3 nautical miles, 3 nautical miles, 3 kilometers, 3 km, and/or the like) indicative of the relative distance of the aircraft to the corridor.

FIG. 3B is a diagram of a display 310 for the system 100 during a current occupation state (e.g., when the aircraft is inside the corridor), in accordance with one or more embodiments of the present disclosure. The corridor graphic 302 includes a corridor label text 304, such as "UAM Corridor", and one or more visual symbols 306 of an aircraft. The corridor graphic 302 also includes a colored background 312 associated with the corridor graphic 302. Note, in this embodiment, the numerical text 308 indicative of the relative distance is not displayed because the result would be "0", negative, undefined, or the like.

In some embodiments, the processor 160 of the system 100 may be further operable (e.g., via program instructions stored on memory 170) to calculate the aircraft is in a current occupation state based on the relative distance. For example, if the relative distance indicates the aircraft is inside a boundary of a corridor. The current occupation state is indicative that the aircraft is currently occupying the corridor.

In some embodiments, the processor 160 of the system 100 may be further operable to display a colored background 312 associated with the corridor graphic 302. The colored background 312 may be used to indicate a current occupation state of the aircraft. For example, the colored background 312 may be configured to be, or to change color (e.g., change to green, white, and/or the like) when the aircraft is calculated to be in the current occupation state (i.e., inside the corridor). This may provide a visual indication of the current occupation state of the aircraft. In other words, the green color (or the like) may quickly indicate to the user that the aircraft has entered the corridor. It is contemplated herein that the color, and/or size (e.g., width, height, etc.) of the corridor graphic 302 as shown, or the like, may be especially proficient at alerting a user compared to other symbols. For instance, the wide horizontal alignment of symbols 306, label 304, and background color 312 may be more easily noticed in the peripheral vision of a user compared to other graphics.

The corridor may be any corridor known in the art. For example, the corridor may include an Urban Air Mobility (UAM) corridor.

FIG. 3C is a top-down diagram of a display 320 for the system 100, in accordance with one or more embodiments of the present disclosure. As shown, the display 145 is a 2-dimensional top-down view.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "in embodiments, "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A system for graphical indication of a corridor comprising:
- a display of a primary flight display (PFD) configured to be used onboard an aircraft; and
- a processor configured to be operable to:
  - display a map;
  - receive corridor position data of a corridor, wherein the corridor position data comprises dimensions of the corridor, wherein the corridor comprises an Urban Air Mobility (UAM) corridor;
  - receive aircraft position data indicative of a position of the aircraft;
  - determine a relative distance of the aircraft in relation to the corridor based on the corridor position data and the aircraft position data; and

- display, via the display of the PFD, a corridor graphic comprising at least one visual symbol inside a boundary associated with the corridor, wherein, based on the relative distance of the aircraft in relation to the corridor, the corridor graphic is configured to be dynamically mapped to the map, wherein the dynamic mapping of the corridor graphic to the map is configured to be performed in at least one of: three-dimensional space or two-dimensional space.

2. The system of claim 1, wherein the processor is further operable to:
- calculate the aircraft is in an imminent occupation state based on the relative distance, wherein the imminent occupation state is indicative that the aircraft is on a trajectory predicted to cause an occupation of the aircraft with the corridor.

3. The system of claim 2, wherein the processor is further operable to:
- display, when the aircraft is calculated to be in the imminent occupation state, numerical text indicative of the relative distance of the aircraft to the corridor.

4. The system of claim 1, wherein the processor is further operable to:
- calculate the aircraft is in a current occupation state based on the relative distance, wherein the current occupation state is indicative that the aircraft is currently occupying the corridor.

5. The system of claim 1, wherein the corridor graphic comprises at least one corridor label text.

6. The system of claim 1, wherein the corridor graphic includes a visual symbol of an aircraft on each side of a corridor label text.

7. The system of claim 6, wherein the corridor graphic includes a horizontal alignment of the visual symbol of the aircraft on each side of the corridor label text.

8. The system of claim 1, wherein the corridor graphic comprises a colored background configured to change color when the position of the aircraft is inside the corridor.

9. A method comprising:
- displaying a map;
- receiving corridor position data of a corridor, wherein the corridor position data comprises dimensions of the corridor, wherein the corridor comprises an Urban Air Mobility (UAM) corridor;
- receiving aircraft position data indicative of a position of an aircraft;
- determining a relative distance of the aircraft in relation to the corridor based on the corridor position data and the aircraft position data; and
- displaying, via a display of a primary flight display (PFD) onboard an aircraft, a corridor graphic comprising at least one visual symbol inside a boundary associated with the corridor, wherein, based on the relative distance of the aircraft in relation to the corridor, the corridor graphic is dynamically mapped to the map, wherein the dynamic mapping of the corridor graphic to the map is performed in at least one of: three-dimensional space or two-dimensional space.

10. The method of claim 9, further comprising calculating the aircraft is in an imminent occupation state based on the relative distance, wherein the imminent occupation state is indicative that the aircraft is on a trajectory predicted to cause an occupation of the aircraft with the corridor.

11. The method of claim 10, further comprising displaying, when the aircraft is calculated to be in the imminent occupation state, numerical text indicative of the relative distance of the aircraft to the corridor.

12. The method of claim 9, further comprising calculating the aircraft is in a current occupation state based on the relative distance, wherein the current occupation state is indicative that the aircraft is currently occupying the corridor.

13. The method of claim 9, further comprising displaying at least one corridor label text in the corridor graphic.

14. The method of claim 9, further comprising displaying a visual symbol of an aircraft on each side of a corridor label text in the corridor graphic.

15. The method of claim 14, further comprising displaying a horizontal alignment of the visual symbol of the aircraft on each side of the corridor label text in the corridor graphic.

16. The method of claim 9, further comprising displaying a colored background in the corridor graphic configured to change color when the position of the aircraft is inside the corridor.

* * * * *